May 2, 1961 D. B. McMAHAN 2,982,130
WELL FORMATION TESTING APPARATUS
Filed Jan. 30, 1958 3 Sheets-Sheet 1
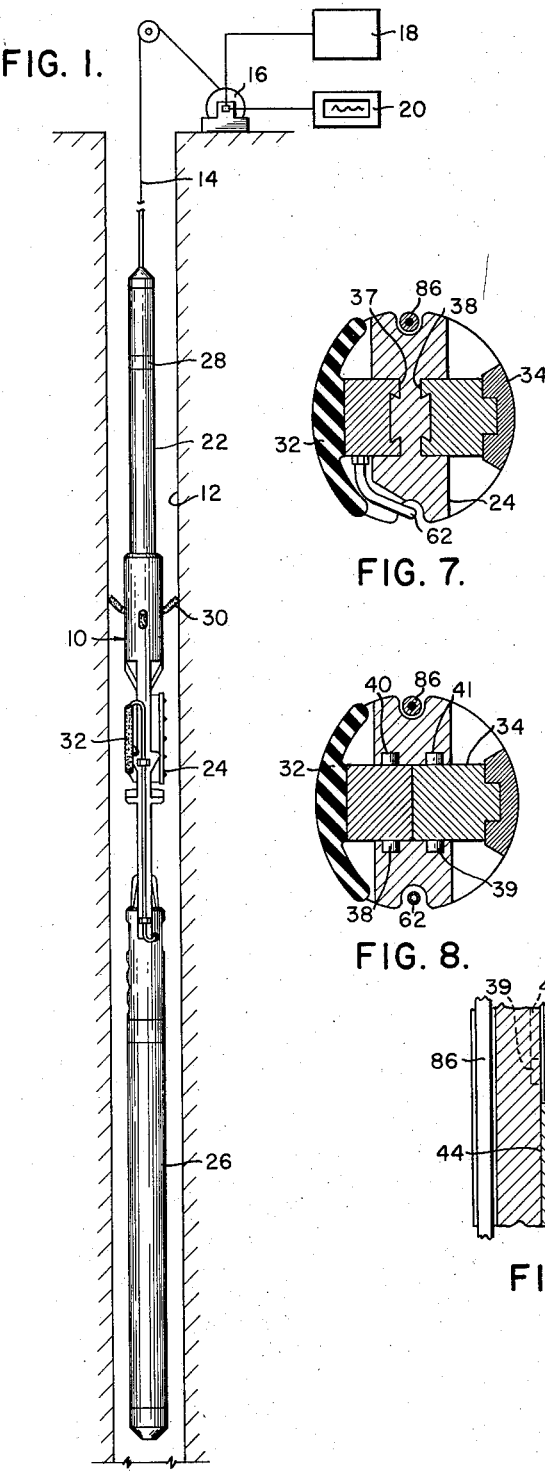
FIG. 1.
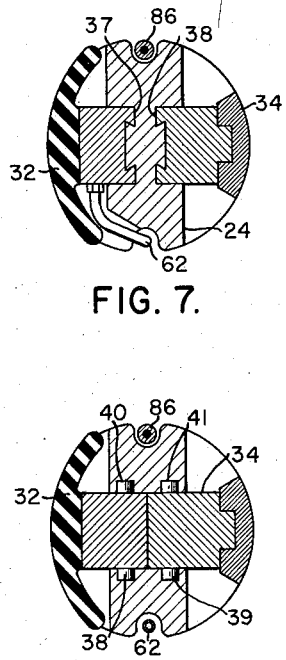
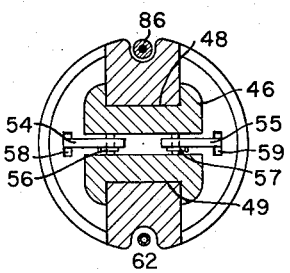
FIG. 7. FIG. 9.
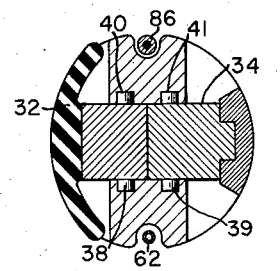
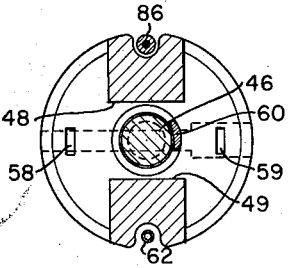
FIG. 8. FIG. 10.
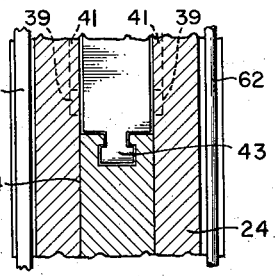
FIG. 11.
INVENTOR.
DURWARD B. McMAHAN,
BY
*Lyon and Lyon*
ATTORNEYS.

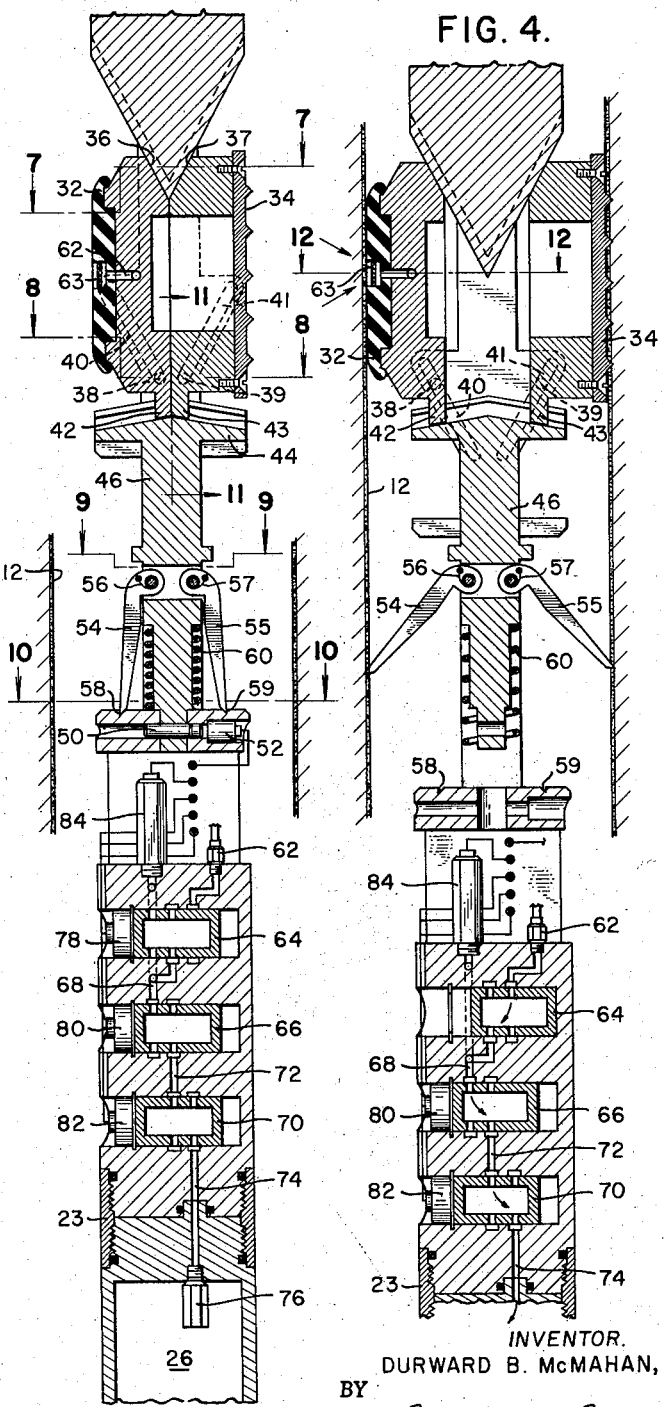

May 2, 1961  D. B. McMAHAN  2,982,130
WELL FORMATION TESTING APPARATUS
Filed Jan. 30, 1958  3 Sheets-Sheet 3
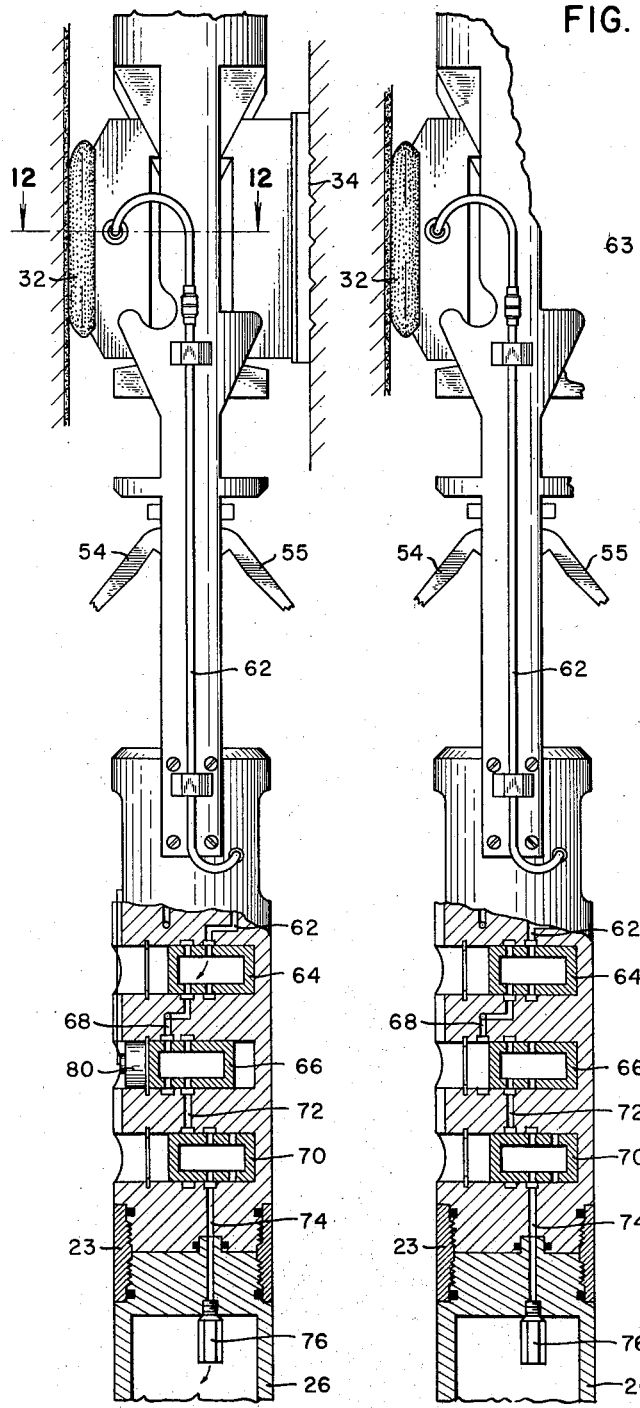
FIG. 5.
FIG. 6.
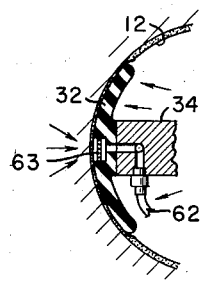
FIG. 12.
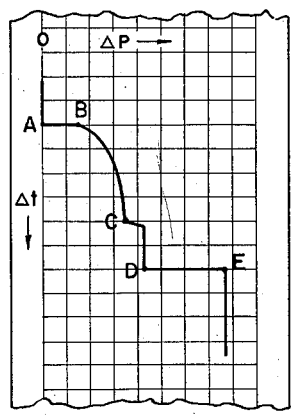
FIG. 13.
INVENTOR.
DURWARD B. McMAHAN,
BY
Lyon and Lyon
ATTORNEYS.

United States Patent Office 2,982,130
Patented May 2, 1961

2,982,130

WELL FORMATION TESTING APPARATUS

Durward B. McMahan, Duncan, Okla., assignor to Welex, Inc., Fort Worth, Tex., a corporation of Delaware Filed Jan. 30, 1958, Ser. No. 712,190

9 Claims. (Cl. 73—155)

This invention generally relates to the testing of earth formations traversed by a well bore and more particularly relates to new and improved apparatus for conducting such testing operations when suspended from a hoisting cable and concurrently indicating formation pressures at the earth's surface.

The method of testing such well formations in predominant use is to isolate the stratum of formation to be tested by means of packers attached to a drill stem or other rigid conduit and thereafter withdraw the formation fluid into the conduit for subsequent examination. Self contained pressure recorders are provided within the tester assembly in fluid communication with the formation to record the flow pressure, closed in pressure, and well bore fluid hydrostatic pressure exhibited during the test. After the drill stem has been removed, the character provided by such recorders are studied for evaluation of the formation productivity. The formations thus tested are usually near the bottom of the well bore and may be isolated for such tests by the use of only one packer with the drill stem. However, tests may be made at any level of the well bore by providing packers above and below the formation.

Performing a test with drill stem testing equipment is of necessity time consuming, requiring a great deal of expensive drilling rig time. Thus, in cases where the formation is indicated by electric logs and drilling fluid samples to be of doubtful productivity, such expense may preclude a test of the formation even though the formation might have sufficient productivity to justify completion of the well. Additionally, the pressure record charts are not available until after the test has been completed and the drill stem withdrawn from the well. Thus, the time sequence of the testing operation must be estimated by the operator, which may cause additional waiting time expense to insure sufficient pressure data.

Considerable effort has been expended to provide testing apparatus which may be rapidly and easily lowered into the well bore from a hoisting line and obtain accurate testing data from such doubtful formations. While some of such apparatus has functioned with fair efficiency, problems have been encountered which deter its use. The most pertinent problem in existing wire line tools is that of effecting a good seal against the wall of a well formation. Failure to effect such a seal results in valueless samples and recorded pressures of only the drilling mud. Also important is that the tool must be released from the formation after the test for removal from the well bore. Expensive fishing operations have resulted when such tools became jammed in the well bore.

It is accordingly an object of the present invention to provide improved wire line apparatus for formation testing which will detect the formation pressures and obtain a fluid sample from the formation in a highly effective manner.

It is another object of the invention to provide apparatus which will effectively seal against the wall of such formation to obtain true formation pressures and pure formation fluid samples.

It is another object of the invention to provide apparatus which, upon completion of the testing operation, may be quickly and conveniently removed from the well bore.

It is a further object of the invention to provide apparatus with which the detected formation pressures may be instantly communicated to the earth's surface for indication and recording.

Briefly described, the objects of the present invention are attained by apparatus including in combination, an elongated tester body adapted to be lowered from an electrical conductor hoisting line through a well bore, provided with a resilient formation isolation means including a sealing pad reciprocally mounted on said body and transversely extendable into contact with a well formation upon longitudinal movement of said isolation means relative to said body. A movement transfer means is mounted in longitudinally reciprocative relation with said body and connected to said isolating means for transferring longitudinal movement between said transfer means and said body to said isolating means. A releaseable latching means is disposed between said transfer means and said body for retaining said isolating means in a retracted position. A restraining means is mounted with said transfer means for engaging a well bore wall and restricting downward movement of said transfer means relative to said well bore upon release-ment of said latching means whereby said isolation means may be extended into contact with said formation by lowering said tester body. A sample chamber is disposed in said body in communication to an external sealing face of said isolating means through a fluid passageway disposed in said body. A check valve may be disposed in said fluid passageway for permitting fluid flow only into said chamber. A fluid pressure sensing means is provided in pressurable communication with said passageway for sensing and transmitting an indication of the formation pressures occurring at said sealing face through said hoisting line to the earth's surface. A selectively actuated valving means is disposed in said body within said passageway including, a first means for communicating fluid pressure to said chamber and said sensing means from said sealing face, a second means for isolating fluid pressure to said chamber while communicating fluid pressure from said sealing face to said sensing means, and a third means for communicating the fluid pressure surrounding said tester body to said sensing means and said sealing face.

Other objects and advantages of the invention will become more apparent from reference to the following description taken in conjunction with the accompanying drawings, in which:

Figure 1 is an elevational view of the testing apparatus suspended in a well bore.

Figure 2 is a more detailed elevation of the actuating elements of the apparatus.

Figure 3 is a longitudinal cross sectional view of the apparatus shown in Figure 2.

Figure 4 is a longitudinal cross section of the apparatus of Figure 3 taken at another stage of operation.

Figure 5 is a partial longitudinal section of Figure 3 taken at another stage of operation.

Figure 6 is a partial longitudinal cross section of Figure 3 taken at another stage of operation.

Figure 7 is a transverse cross section taken at 7—7 of Figure 3.

Figure 8 is a transverse cross section of the apparatus taken at 8—8 of Figure 3.

Figure 9 is a transverse cross section taken at 9—9 of Figure 3.

Figure 10 is a transverse cross section taken at 10—10 of Figure 3.

Figure 11 is a partial longitudinal cross section of the apparatus taken at 11—11 of Figure 3.

Figure 12 is a partial transverse cross section of the formation isolating pad of the testing apparatus taken at 12—12 of Figure 4.

Figure 13 is a typical chart recorded during the test of a well formation.

Referring to Figure 1, the tester tool 10 is shown suspended in a well bore 12 from a hoisting cable 14. Cable 14 is connected into a hoisting unit 16 which is adapted to raise or lower the tool 10 to any desired position within well bore 12. In electrical connection with tool 10 through cable 14 and hoisting unit 16 is an electrical control means 18 and an electrical indicating and recording means 20.

Tool 10 generally includes three sections, an upper electrical switching housing 22, a testing body 24, and a lower fluid chamber 26. A spontaneous potential logging electrode 28 is mounted on switch housing 22. Shown at 30 are resilient centralizer arms radially mounted with the body 24 which contact the walls of well bore 12 and tend to keep the tester tool 10 concentrically disposed within the bore.

Referring to Figures 2 and 3 in view of Figures 7, 8, 9, 10 and 11, body 24 is seen to include a resiliently faced isolating pad assembly 32 and a supporting member 34 reciprocally mounted with body 24. Members 32 and 34 are connected to body 24 at their upper end by means of longitudinally diverging dove-tailed trackways 36 and 37 and at their lower ends by pins 38 and 39 extending into longitudinally diverging slotways 40 and 41. The dovetail connections 36 and 37 are illustrated in Figures 3 and 7 and the pin and slot connections are illustrated in Figures 3 and 8. Connected by means of lugs 42 and 43 to the lower ends of members 32 and 34 is a grooved crosshead 44. Connection of the lugs and crosshead is shown in Figures 3 and 11. Downward movement of body 24 relative to crosshead 44 will cause members 32 and 34 to transversely extend from the testing body into contact with the well bore wall. Crosshead 44 is disposed at the upper end of a transfer rod 46 which, as shown in Figures 9 and 10, is reciprocally mounted within trackways 48 and 49 of body 24.

A releasable latching means, exampled as a release pin 50 and electrically ignited powder load 52, is disposed in connection between transfer rod 46 and testing body 24 to retain transfer rod 46 in a lower retracted position until released. Pad member 32 and wicker member 34 are thereby retained in a transversely retracted position.

Mounted in hinged relation with the transfer rod 46 are one or more restraining pawl arms designated 54 and 55. Arms 54 and 55 are provided with springs 56 and 57 adapted to urge the arms to pivot out transversely from transfer rod 46 into contact with the well bore wall. Complementary recesses 58 and 59 are disposed in body 24 to retain arms 54 and 55 into retracted position when transfer rod 46 is latched in the lower position. An unlatching spring 60, disposed in compression at the lower end of transfer rod 46 between the rod and tester body 24, urges the transfer rod a sufficient distance upward to release arms 54 and 55 upon actuation of the release pin 50.

When arms 54 and 55 are urged into contact with the well bore wall by the springs 56 and 57, relative movement between the transfer rod 46 and the bore wall is then permitted in an upward direction only. When tester body 24 is moved downwardly relative to the well bore wall the transfer rod will be restrained from downward movement by the pawl action of arms 54 and 55.

A flow passageway 62 is disposed in communication from the sealing face of pad member 32 to a flow valve 64 disposed within body 24. The mouth of passageway 62 at member 32 may be covered by a screen 63 to prevent clogging of the passageway by foreign particles. Flow valve 64 is in communication with an equalizing valve 66 through a passageway 68 disposed in body 24. Equalizing valve 66 is in communication with a shut-in valve 70 through a passageway 72. Shut-in valve 70 is in communication with sample chamber 26 through a passageway 74 and a check valve 76. Check valve 76 permits fluid flow into chamber 26 but prevents flow therefrom. As shown, sample chamber 26 may be threadedly connected to body 24 by means of a right and left hand threaded collar 23 to provide convenient detachment following a testing operation.

Valves 64, 66 and 70 are herein exampled as being of single action sleeve type which are respectively actuated from a first position into an air void to a second position. The valves are isolated from surrounding well bore fluid pressure by electrically actuated powder loaded valve covers 78, 80, and 82. Upon selective ignition the covers are removed from the ends of the sleeve cylinders, allowing the hydrostatic fluid pressure of well bore fluids to urge the valve sleeves to the second position. Flow valve 64 permits fluid communication between passages 62 and 68 when moved to a second position. Equalizing valve 66 permits fluid communication to passageway 68 from the well fluids surrounding body 24 upon moving to a second position. Shut-in valve 70, when moved to a second position, isolates fluid communication between passageways 72 and 74.

A pressure sensing means 84 is disposed in pressure communication with passageway 68. Sensing means 84 is adapted to sense and indicate fluid pressure found in passageway 68 during various stages of the testing operation, as later described.

Release load 52, cover loads 78, 80 and 82, and pressure sensing means 84 are provided with electrical connection into the electrical housing 22 through conductors 86, disposed in and along testing body 24 as illustrated in Figures 7 through 10. Logging electrode 28 is also connected into section 22.

The electrical circuit for tester 10 is an adaptation of somewhat conventional perforating gun circuits and will be only briefly described. Logging electrode 28, release charge 52, valve cover charges 78, 80 and 82, and pressure sensing means 84 are connected into contact terminals of a solenoid actuated stepping switch. Voltage at 60 cycles is provided from control means 18 through cable 14 to selectively actuate the solenoid switch from one step to the next. Voltage at 400 cycles is provided from control means 18 to selectively ignite the powder charges upon their respective connection into the cable circuit. Direct current is provided through pressure sensing means 84 which may be varied by change of resistance in the pressure sensing means responsive to change in fluid pressure. This direct current variation is then recorded by the recorder 20. Suitable chokes and capacitors are provided to respectively direct each alternating and direct current.

As previously mentioned, the testing apparatus 10 is usually used to sample formations previously considered for possible productivity by reference to electric or radioactive logs of the well. The tester apparatus is then placed in the well bore adjacent formations indicated as promising by such logs.

In operation, apparatus 10 is lowered into the well bore to an approximate depth indicated by such previous logs. The logging electrode 28 is switched into circuit to give surface indication of the spontaneous potential of adjacent formation. The testing apparatus is then adjusted, by reference to the indication from electrode 28, to the exact depth of the promising formation. Release charge 52 and pressure sensing means 84 are then switched into circuit by control means 18.

Release charge 52 is then ignited by control means 18, driving out release pin 50 and thereby releasing transfer rod 46. Transfer rod 46 is then urged upwardly by unlatching spring 60 a distance sufficient to free the pawl arms 54 and 55 from recesses 58 and 59. The pawl arms, in response to springs 56 and 57, are then urged into contact with the walls of well bore 12. When the pawl arms attain contact with the bore walls, movement of transfer rod 46 and its associated connected elements are prevented from downward movement relative to the bore by pawl action of said arms.

The testing apparatus 10 is then lowered by cable 14. Transfer rod 46 remains immobile, causing relative longitudinal movement between testing body 24 and said rod. The isolating pad assembly 32 and wicker member 34 is therein urged up the dove-tail and pin and slot connections into initially forceful and gripping contact with the well bore walls.

After attaining initially gripping contact with the walls of the well bore as shown in Figure 4, pad assembly 32 and retaining member 34 are further engaged into more forceful contact by the entire weight of testing apparatus 10. In the embodiment presently illustrated tool 10 weighs about 385 pounds and may be additionally ballasted. Typical runs have been made with a total tool weight of approximately 600 pounds.

Isolating pad assembly 32, upon seating with the walls of well bore 12, is disposed in the position generally illustrated in Figure 12. As shown, the resilient sealing face of assembly 34 is in contiguous relation with the walls of well bore 12 and passageway 62 is in direct communication with the surrounding formation.

Upon seating of the isolating assembly 32 and wicker member 34 the valve cover charge 78 is switched into circuit and fired by control means 18. Cover 78 is thereon forced away from flow valve 64, permitting the hydrostatic pressure of surrounding well bore fluids to move valve 64 from closed to open position. This action is illustrated in Figure 4.

Fluid communication is now established from the well formation through passages 62, 68, 72 and 74 into fluid chamber 24. Pressure sensing device 84 is in pressureable communication with passage 68.

As shown in Figure 12, a pressure drop thereon occurs at the face of isolating assembly 34 at the point in communication with passageway 62. The hydrostatic pressure of the well fluids continue to bear on the surrounding lips of the resilient portion of member 34. The drilling mud filter cake normally found against the walls of permeable formations serve an intermediate gasket effect to further the seal.

A typical sample chart recorded from sensing device 84 is illustrated in Figure 13. As shown, when tester apparatus 10 is lowered into the well bore, pressure sensing device is at atmospheric pressure, indicated at A. Upon opening of flow valve 64, the pressure within tester tool 10 changes from A to B, the initial formation pressure at assembly 34.

The formation is thereon allowed to flow into sample chamber 26 for a time period $\Delta t$. As the fluid flow from the formation continues, the pressure increases due to pressure accumulation in the chamber 26 and increasing flow from the formation. This flow pressure is indicated by the curve B—C in Figure 13.

Since the pressures indicated in Figure 13 are concurrently observable to an operator at the earth's surface, the flow may be continued only as long as desired. At such time as the flow pressure appears to be becoming stable, valve cover charge 82 may be switched into circuit and ignited by control means 18. As shown in Figure 5, ignition of cover charge 82 removes the cover from shut-in valve 70, allowing the valve to move into closed position. Flow into chamber 24 thereon ceases. The static fluid pressure of the formation will continue to be in communication with pressure sensing means 84 through passageway 62. The static formation pressure with the shut-in valve 70 closed through a time period $\Delta t$ is indicated on the chart of Figure 13 at the curve C—D.

It is pointed out that check valve 76, though preventing return of fluids from chamber 24, is not needed at this stage since shut-in valve 70 prevents fluid flow in either direction. At times the formation pressure may be too low to initiate passage through such spring loaded check valves. This valve may then be dispensed with and valves 64 and 70 utilized as sole control of the fluid pressure in chamber 24.

Upon determination of the ultimate closed in formation pressure, the equalizing valve cover 80 is switched into firing position and ignited by control means 18. Upon removal of cover 80 the hydrostatic fluids move equalizing valve 66 into equalizing position. This is shown in Figure 6. The surrounding well bore fluids may then communicate through the passage 68 to the pressure sensing device 84 and through passage 62 to the portion of formation sealed off by isolating assembly 32. The pressures across the isolating pad assembly thereon equalize, permitting ready removal of the assembly from the well bore wall. This change in pressure resulting from actuation of equalizing valve 62 is indicated in the chart of Figure 13 by the curve D—E.

Tension is then taken on cable 14, removing the weight of tester 10 from the extended members 32 and 34 and tending to lift the tester within the well bore. Isolating pad assembly 32 and wicker member 34 are thereon free to converge down dove-tail connection 36 and 37 and slots 40 and 41 into retracted position. Transfer rod 46 descends within tester body 24, as the body is raised, into the lowest position permitted by unlatching spring 60. Tool 10 is now ready for withdrawal from the well bore. As the tool is withdrawn the pawl arms 54 and 55 continue to slide against the walls of well bore 12 but do not engage upon movement in an upward direction.

The tool is thereon withdrawn from the well bore. Sample chamber 24 is removed from the tool and its contents examined for evaluation of the formation thus tested. The tool may thereon be reassembled for a subsequent testing operation.

It is pointed out that other means of engaging transfer rod 46 to the well bore, such as drag springs may be provided. However, the pawl arms 54 and 55 have been found to be more positive in action and to create less drag upon retrieval of the tool 10 from the well and are therefore preferred.

It is therefore understood, while only one embodiment of the invention has been disclosed herein, that various changes may be made without departing from spirit of the invention. The invention should not be regarded as limited, therefore, except by the scope of the appended claims.

That being claimed is:

1. In well formation testing apparatus, an elongated tester body adapted to be lowered from an electrical logging cable into a well bore, said body defining a fluid chamber for retaining a fluid sample, a formation isolation means including a support member and a resilient sealing pad member having one surface facing the walls of said bore, means including trackways laterally diverging from the axis of said body for connecting said pad and said support member in reciprocating relation to said body, a transfer member connected to said pad and said support means and mounted in longitudinal reciprocating relation with said body for reciprocating said pad member and said support member along said trackways in response to longitudinal movement between said transfer member and said body, a releasable latch electrically actuated through said cable connecting said transfer member to said body in a first position retaining said pad member and said support member in laterally retracted position, resiliently extendable restraining means connected to said transfer means for engaging said bore wall to restrain said transfer means from movement within said bore whereby said restraining means and said transfer means will be restrained to cause movement of said fluid isolation means along said trackways into contact with said bore wall upon release of said latching means and movement of said body, a fluid passageway connected between said chamber and an opening in the face of said pad surface, a fluid pressure sensing means connected with said passageway for transmitting an electrical indication of the pressures occurring within said passageway through said cable to the earth's surface, valving means disposed within said passageway and electrically actuated through said cable including means for initially opening said passageway from said pad surface to said pressure sensing means and to said chamber, means for next closing said passageway to said chamber and leaving open said passageway to said pressure sensing means, and means for lastly opening said passageway from said pad face opening and said pressure sensing means to the exterior of said body, switching means disposed within said tester body and electrically actuated through said cable from the earth's surface for selectively connecting said latching means, said sensing means and said valving means into electrical communication with said cable.

2. In well formation testing apparatus, an elongated tester body adapted to be lowered from an electrical logging cable into a well bore, said body defining a fluid chamber for retaining a fluid sample, a formation isolation means including a resilient sealing pad member having one surface facing the walls of said bore, means including trackways laterally diverging from the axis of said body for connecting said pad member in reciprocating relation to said body, a transfer member connected to said pad member and mounted in longitudinal reciprocating relation with said body for reciprocating said pad member along said trackways in response to longitudinal movement between said transfer member and said body, an electrically actuated releasable latch connecting said transfer member to said body in a first position retaining said pad member in laterally retracted position, resiliently extendable restraining arms connected to said transfer member for engaging said bore wall to restrain said transfer member from movement in one direction within said bore whereby said transfer member will be restrained to cause movement of said pad member along said trackways into contact with said bore wall upon release of said latch and movement of said body in said one direction, said restraining arms being held retracted by said latch from said bore wall until released, a fluid passageway connected between said chamber and an opening in said pad surface, valving means disposed within said passageway and electrically actuated through said cable including, means for initially opening said passageway from said pad face to said chamber and means for then closing said passageway to said chamber, means including a logging electrode mounted on said tester body for detecting a particular formation to be tested, electrical means including a switching means disposed within said tester body and electrically actuated through said line from the earth's surface for selectively connecting said latch, said valving means and said logging electrode into electrical communication with the earth's surface through said cable.

3. In well formation testing apparatus, an elongated tester body adapted to be lowered from an electrical logging cable into a well bore, said body defining a fluid chamber for retaining a fluid sample, a formation isolation means including a support member and a resilient sealing pad having one surface facing the walls of said bore, means including trackways disposed on opposed sides of said body which are laterally diverging from the axis of said body for connecting said pad and said support member in reciprocating relation to said body, transfer means connected to said pad and said support means and mounted in longitudinal reciprocating relation with said body for reciprocating said pad and said support member along said trackways in response to longitudinal movement between said transfer means and said body, electrical latching means connecting said transfer means to said body in a first position retaining said isolation means and said support member in laterally retracted position, resiliently extendable restraining means connected to said transfer means for engaging said bore wall to restrain said transfer means from movement in one direction within said bore whereby said restraining means and said transfer means will be restrained to cause movement of said fluid isolation means along said trackways into contact with said bore wall upon release of said latching means and movement of said body in said one direction, said restraining means being held by said latching means from said bore wall until said latching means is released, a fluid passageway connecting said chamber to an opening in said pad surface, a check valve means disposed in said passageway for permitting fluid flow only into said chamber, a fluid pressure sensing means connected with said passageway for transmitting an electrical indication of the pressures occurring within said passageway through said cable to the earth's surface, valve means disposed within said passageway and electrically actuated through said cable including, means for initially opening said passageway from said pad face to said pressure sensing means and said chamber, means for next closing said passageway to said chamber and leaving open said passageway to said pressure sensing means, and means for lastly opening said passageway from said pad face opening and said pressure sensing means to the exterior of said body, means including a logging electrode mounted on said tester body for transmitting an electrical indication through said cable representing a particular formation to be tested, electrical means including a switching means disposed within said tester body and electrically actuated through said cable from the earth's surface for selectively connecting said latching means, said sensing means, said valving means and said logging electrode into connection with said cable.

4. In well formation testing apparatus, an elongated tester body adapted to be lowered from an electrical logging cable into a well bore, said body defining a fluid chamber for retaining a fluid sample, a resilient sealing pad member having one surface facing the walls of said bore, means including trackways laterally diverging from the axis of said body for connecting said pad member in reciprocating relation to said body, a transfer means connected to said pad member and mounted in longitudinal reciprocating relation with said body for reciprocating said pad member along said trackways in response to longitudinal movement between said transfer means and said body, a releasable electrically actuated latch connecting said transfer member to said body in a first position retaining said pad member in laterally retracted position, resiliently extendable restraining means connected to said transfer member and normally engaging said bore wall to restrain said transfer member from movement relative to said bore wall and cause movement of said pad member along said trackways into contact with said bore wall upon release of said transfer member by said latching means and movement of said body, a fluid passageway connected between said chamber and an opening in said pad surface, and valving means disposed within said passageway and adapted for electrical actuation through said cable including means for initially opening said passageway from said pad surface to said chamber and means for then closing said passageway to said chamber, switching means disposed within said tester body and electrically actuated through said cable for selectively connecting said latching means and said valving means into connection with said cable.

5. An apparatus for isolating an earth formation traversed by a well bore from a fluid column contained within said bore, comprising, an elongated body adapted to be lowered into said bore, a sealing pad member having one surface facing and conformable to the wall of said bore, a fluid entry port in said one surface, a support member facing said bore wall, connecting means including trackways laterally inclined from said body for supporting said pad member and said support member in reciprocating relation from a retracted position against said body to an extended position against said bore wall, a transfer member mounted in longitudinally movable relation with said body to reciprocate said pad member and said support member along said trackways, resiliently extendable restraining pawl members mounted in hinged relation to said transfer member for restraining said transfer means from movement within said bore in one direction when released into engaged position with said bore wall, releasable latching means connecting said transfer member to said body in a position retaining said pad member and said support member against said body and retaining said pawl members in retracted position, and testing means within said body to test said formation through said port.

6. The apparatus of claim 5 wherein said testing means includes a chamber within said body, a fluid passageway for providing fluid communication between said chamber and said port, a fluid pressure sensing means in connection with said passageway, a first, a second, and a third single action valve disposed in said passageway, said first valve providing fluid communication from said chamber and said sensing means to said port when actuated, said second valve blocking fluid communication from said chamber to said port and leaving fluid communication from said sensing means to said port when actuated, and said third valve leaving fluid communication blocked to said fluid chamber and providing fluid communication from said port and said sensing means to outside said body when actuated.

7. In apparatus for isolating an earth formation traversed by a well bore from a fluid column contained within said bore, comprising, an elongated body adapted to be lowered into said bore, a sealing pad member having one surface facing and conformable to the wall of said bore, a fluid entry port in said one surface, connecting means including trackways laterally inclined from said body for supporting said pad member in reciprocating relation from a retracted position against said body to an extended position against said bore wall, a transfer member mounted in longitudinally movable relation with said body to reciprocate said pad member along said trackways, an extendable restraining pawl member resiliently mounted in hinged relation to said transfer member for restraining said transfer member from movement within said bore in one direction when released into engaged position with said bore wall, a releasable latch connecting said transfer member to said body in a position retaining said pad member against said body and retaining said pawl member in retracted position, and means within said body to test said formation through said port.

8. In apparatus for isolating an earth formation traversed by a well bore from a fluid column contained within said bore, comprising, an elongated body adapted to be lowered into said bore, a sealing pad member having one surface facing and conformable to the wall of said bore, a fluid entry port in said one surface, a support member facing said bore wall, connecting means including trackways laterally inclined from said body for supporting said pad member and said support member in reciprocating relation from a retracted position against said body to an extended position against said bore wall, a transfer member mounted in longitudinally movable relation with said body to reciprocate said pad member and said support member along said trackways, resiliently extendable restraining means mounted to said transfer member for engaging said bore wall and restraining said transfer means from movement within said bore, a releasable latch connecting said transfer member to said body in a position retaining said pad member and said support member against said body, and means within said body to test said formation through said port.

9. An apparatus for isolating an earth formation traversed by a well bore from a fluid column contained within said bore, comprising, an elongated body adapted to be lowered into said bore, a sealing pad member having one surface facing and conformable to the wall of said bore, a fluid entry port in said one surface, connecting means including trackways laterally inclined from said body for supporting said pad member in reciprocating relation from a retracted position against said body to an extended position against said bore wall, a transfer member mounted in longitudinally movable relation with said body to reciprocate said pad member along said trackways, resiliently extendable restraining means mounted to said transfer member for engaging said bore wall and restraining said transfer member from movement within said bore upon movement of said body, a releasable latch connecting said transfer means to said body in a position retaining said pad member against said body, and testing means within said body to test said formation through said face port.

References Cited in the file of this patent
UNITED STATES PATENTS

| | | |
|---|---|---|
| 2,262,655 | Seale | Nov. 11, 1941 |
| 2,313,369 | Spencer | Mar. 4, 1943 |
| 2,441,894 | Mennecier | May 18, 1948 |
| 2,623,594 | Sewell | Dec. 30, 1952 |
| 2,851,107 | Chivens et al. | Sept. 9, 1958 |